(12) United States Patent
Wunderlich et al.

(10) Patent No.: US 9,889,721 B2
(45) Date of Patent: Feb. 13, 2018

(54) METHOD AND OPERATING DEVICE FOR OPERATING AN AIR CONDITIONING SYSTEM OF A VEHICLE

(71) Applicant: AUDI AG, Ingolstadt (DE)

(72) Inventors: Matthias Wunderlich, Ingolstadt (DE); Christian Wall, Hitzhofen (DE)

(73) Assignee: Audi AG, Ingolstadt (DE)

( * ) Notice: Subject to any disclaimer, the term of this patent is extended or adjusted under 35 U.S.C. 154(b) by 15 days.

(21) Appl. No.: 15/135,017

(22) Filed: Apr. 21, 2016

(65) Prior Publication Data

US 2016/0311293 A1    Oct. 27, 2016

(30) Foreign Application Priority Data

Apr. 22, 2015 (DE) .................. 10 2015 005 126

(51) Int. Cl.
*B60H 1/00* (2006.01)
*B60H 1/34* (2006.01)
(Continued)

(52) U.S. Cl.
CPC ..... *B60H 1/00985* (2013.01); *B60H 1/00821* (2013.01); *B60H 1/00842* (2013.01); *B60H 1/34* (2013.01); *B60K 35/00* (2013.01); *B60K 37/06* (2013.01); *B60H 2001/3471* (2013.01); *B60K 2350/102* (2013.01);
(Continued)

(58) Field of Classification Search
CPC ............ B60H 1/00985; B60H 1/00821; B60H 1/00842; B60H 1/34; B60H 2001/3471; B60K 35/00; B60K 37/06; B60K 2350/102; B60K 2350/1024; B60K 2350/1028; B60K 2350/1052
See application file for complete search history.

(56) References Cited

U.S. PATENT DOCUMENTS

2015/0273984 A1* 10/2015 Suzuki ............... B60H 1/00007
454/152

FOREIGN PATENT DOCUMENTS

CN         202071786 U     12/2011
CN         104442281 A      3/2015
(Continued)

OTHER PUBLICATIONS

Chinese Search Report dated Oct. 20, 2017 with respect to counterpart Chinese patent application 201610024470.0.
(Continued)

*Primary Examiner* — Michael D Lang
(74) *Attorney, Agent, or Firm* — Henry M. Feiereisen LLC

(57) ABSTRACT

A method for operating an air conditioning system of a vehicle includes actuating an operating element of an air vent of the air condition system for a defined first time period, the actuating for the first time period causing activation of a control slider function for adjusting the outflow volume, actuating the operating element for a defined second time period, which is shorter than the first time period, the actuating for the second time period causing a popup menu which optically displays a numerical value of an actual outflow volume of the air vent being displayed on an onboard monitor of the vehicle, and adjusting the outflow volume with a further operating element in the popup menu and simultaneously optically displaying a numerical value of the adjusted outflow volume.

8 Claims, 3 Drawing Sheets

(51) Int. Cl.
 *B60K 35/00* (2006.01)
 *B60K 37/06* (2006.01)
(52) U.S. Cl.
 CPC .............. *B60K 2350/1024* (2013.01); *B60K 2350/1028* (2013.01); *B60K 2350/1052* (2013.01)

(56) References Cited

FOREIGN PATENT DOCUMENTS

| | | |
|---|---|---|
| DE | 10 2008 052 442 | 6/2009 |
| DE | 10 2008 018 562 A1 | 10/2009 |
| DE | 10 2009 011 710 A1 | 9/2010 |
| DE | 10 2010 028 051 A1 | 1/2011 |
| DE | 10 2010 018 105 A1 | 10/2011 |
| DE | 10 2012 021 519 A1 | 5/2014 |
| DE | 10 2013 021 477 | 8/2014 |
| DE | 10 2013 220 994 | 4/2015 |

OTHER PUBLICATIONS

English translation of Chinese Search Report dated Oct. 20, 2017 with respect to counterpart Chinese patent application 201610024470.0.

\* cited by examiner

METHOD AND OPERATING DEVICE FOR OPERATING AN AIR CONDITIONING SYSTEM OF A VEHICLE

CROSS-REFERENCES TO RELATED APPLICATIONS

This application claims the priority of German Patent Application, Serial No. 10 2015 005 126.1, filed Apr. 22, 2015, pursuant to 35 U.S.C. 119(a)-(d), the content of which is incorporated herein by reference in its entirety as if fully set forth herein.

BACKGROUND OF THE INVENTION

The present invention relates to a method for operating an air conditioning system and an operating device for implementing the method according to the invention.

The following discussion of related art is provided to assist the reader in understanding the advantages of the invention, and is not to be construed as an admission that this related art is prior art to this invention.

A generic operating device for an air conditioning system of a vehicle is known from DE 10 2009 011 710 A1. The air vents of this air conditioning system include display and operating elements with which the outflow direction of the air and the outflow volume can be adjusted. The outflow direction is adjusted by means of a mechanical operating element, while for adjusting the outflow direction a capacitive slider in the manner of a slide bar is used, which can be operated by approaching or touching and horizontal sliding movement on an operating surface.

A disadvantage of such sensor surfaces is however that they do not allow an exact adjustment of a desired airflow because no feedback regarding the adjusted value of the airflow is outputted. Such a sensor system thus only allows a coarse adjustment of the outflow volume.

It would therefore be desirable and advantageous to improve a method for operating an air conditioning system of a vehicle of the aforementioned type so that in addition to a coarse or inaccurate adjustment of the outflow volume at an air vent also an exact adjustment is possible.

SUMMARY OF THE INVENTION

According to one aspect of the invention a method for operating an air conditioning system of a vehicle includes actuating an operating element of an air vent of the air condition system for a defined first time period, the actuating for the first time period causing activation of a control slider function for adjusting the outflow volume, actuating the operating element for a defined second time period, which is shorter than the first time period, the actuating for the second time period causing a popup menu which optically displays a numerical value of an actual outflow volume of the air vent being displayed on an onboard monitor of the vehicle, and adjusting the outflow volume with a further operating element in the popup menu and simultaneously optically displaying a numerical value of the adjusted outflow volume In the method according to the invention two operating modes are provided, i.e., a first operating mode in which the actuating surface of the operating element is actuated for a first time interval, and a second operating mode which is activated when the actuating surface of the operating element is actuated for a second time interval which is shorter than the first time interval. This second time interval corresponds to a short tip on the actuating surface of the operating element. With this short tip on the actuating surface of the operating element a popup menu is displayed on the display of an onboard monitor, which popup menu then enables a precise adjustment of the outflow volume by means of a further operating element. At the same time the numerical value of the actually adjusted outflow volume is precisely displayed with this popup menu.

On the other hand when the actuating surface of the operating element is not only briefly touched, but is actuated for a longer period of time corresponding to the first time interval by moving the finger on the touch screen so as to move the control slider displayed on the actuating surface of the operating element, the first operating mode is activated. With the displayed virtual control slider the outflow volume can only be adjusted coarsely because the adjusted value is displayed only graphically, i.e., not numerically, i.e., only by the position of the control slider.

According to another advantageous feature of the invention the onboard monitor can be configured with a touch-sensitive screen as further operating element. As an alternative a rotary switch can be provided as further operating element.

According to another advantageous feature of the invention further air vents of the air conditioning system are displayed on the onboard monitor by means of the popup menu, wherein the outflow volume of the further air vents can be adjusted by means of the further operating element. The method according to the invention can also be configured so that the outflow volume can be adjusted simultaneously for all air vents by means of the further operating element.

According to another aspect of the invention an operating device for operating an air conditioning system of a vehicle, said operating device includes an air vent which includes at least one operating element, said operating element having a touch-sensitive actuating surface adapted to adjust an outflow volume of the air vent; a control device connected with the operating element, said control device being configured to cause a control slider function for adjusting the outflow volume to be displayed on the touch-sensitive actuating surface in response to actuation of the operating element for a defined first time period, and in response to actuation of the operating element for a defined second time period, which is shorter than the first time period, to cause a popup menu with an optical display of a numerical value of an actual outflow volume of the air vent to be displayed on an onboard monitor of the vehicle for adjustment of the outflow volume; and a further operating element for adjusting the outflow volume displayed in the popup menu.

According to another advantageous feature of the operating device, the onboard monitor is configured with a touch-sensitive monitor as further operating element and/or a rotary switch as the further operating element is provided.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
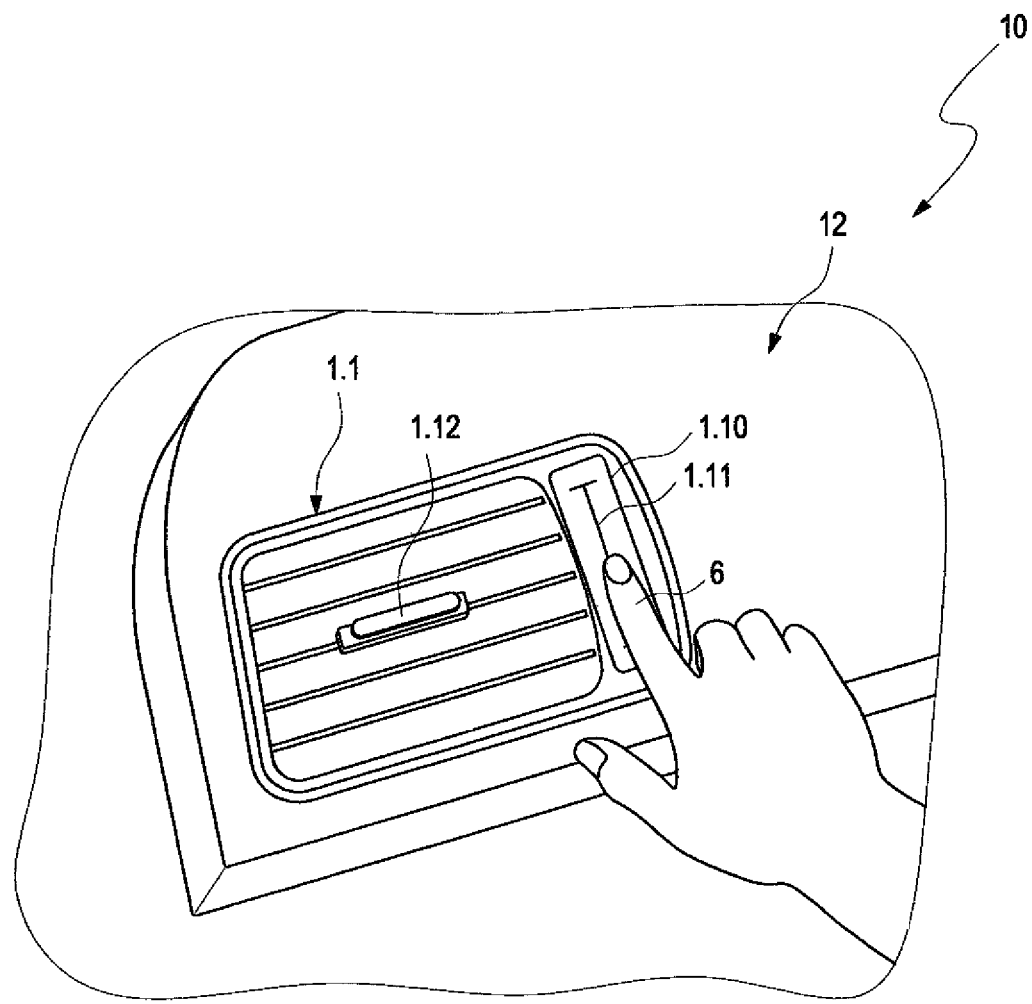
FIG. 1 is a schematic representation of an air vent with an operating element arranged in an instrument panel of a vehicle.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
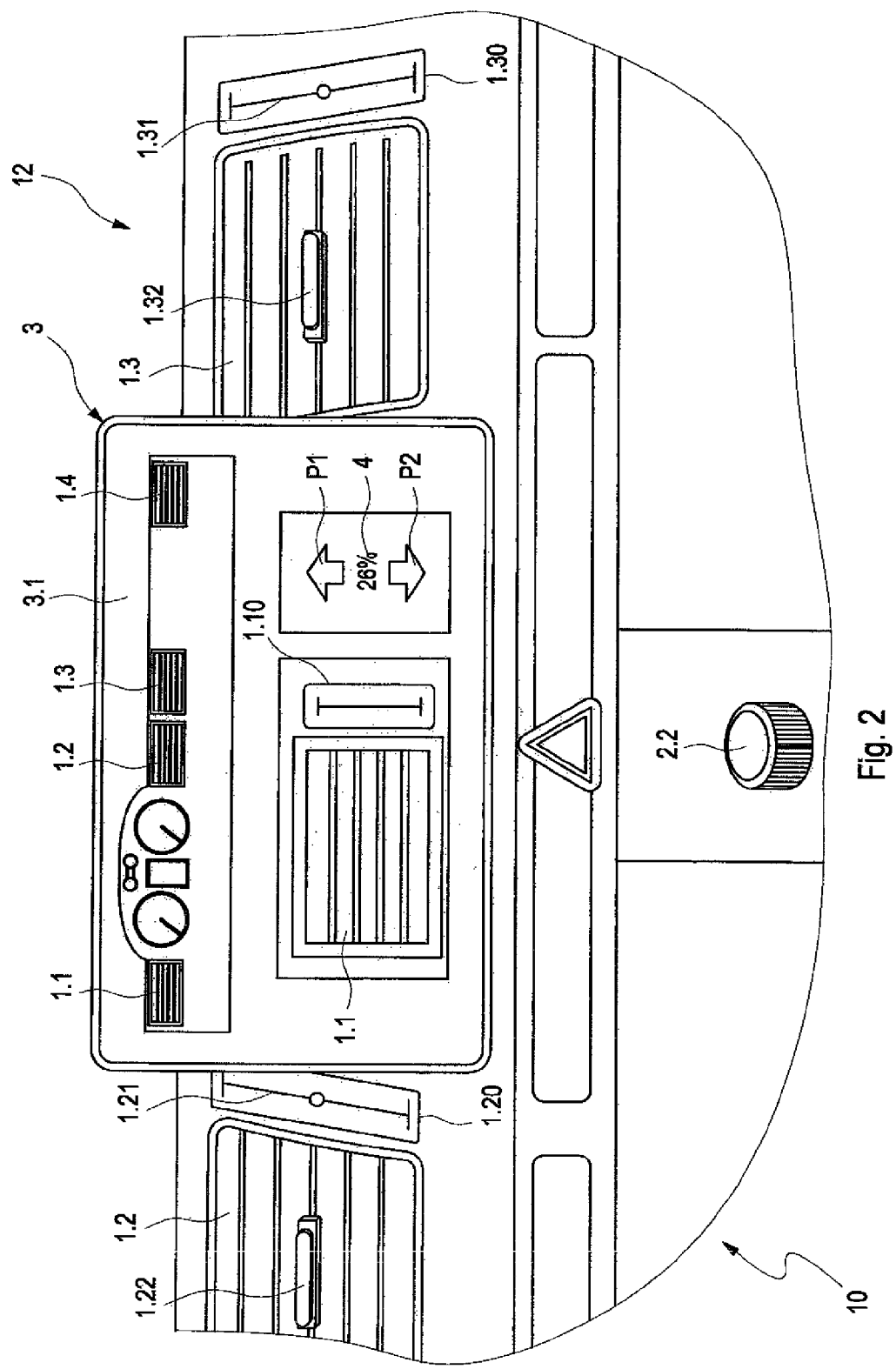
FIG. 2 is a schematic representation of an instrument panel with air vents according to FIG. 1 and an onboard monitor of a driver information system.

FIGS. 1 and 2 each show a section of an instrument panel 12 of a vehicle 10 with an air conditioning system with associated air vents. FIG. 1 shows an air vent 1.1 with an associated operating element 1.10 and FIG. 2 shows two further air vents 1.2 and 1.3 each with associated operating element 1.20 and 1.30. Situated between these two air vents is an onboard monitor 3 with a display as display panel of a driver information system of the vehicle 10, which information system together with a rotary switch 2.2 forms a multifunctional operating device, which is also referred to as multi media interface (MMI). The function of such an MMI system is essentially to operate radio, CD/TV, telephone and navigation systems and to adjust the air conditioning system.

The air vents 1.1, 1.2 and 1.3 of the instrument panel 12 shown in FIGS. 1 and 2 are configured with air guide vanes, which can be adjusted by means of an operating element 1.12, 1.22 or 1.32 for adjusting the outflow direction. However, the outflow volumes at the air vents 12.1, 1.2 and 1.3 is not adjusted by means of mechanical operating elements but with touch-sensitive actuating surfaces and by means of the onboard monitor 3 as explained below.

For this purpose these air vents 1.1, 1.2 and 1.3 each have an operating element 1.10, 1.20 and 1.30, which are implemented as touch-sensitive actuating surface or touch-sensitive operating surface 1.11, 1.21 or 1.31 in the manner of a touch pad. The air vents 1.2, 1.2 and 1.3 have a quadrangular contour so that the operating elements 1.10, 1.20 and 1.30 with a rectangular contour are arranged directly adjacent a side of the air vents 1.1, 1.2 and 1.3.

For adjusting the outflow volume at an air vent 1.1, 1.2 and 1.3 two operating modes are available. These two operating modes are activated in dependence on the duration of an actuation of the operating element 1.10, 1.20 or 1.30, i.e. they depend on how long the finger 6 of an operator touches the touch-sensitive actuating surface 1.11, 1.21 or 1.31.

Thus a first operating mode is provided in that the actuating surface 1.11, 1.21 or 1.31 of the operating element 1.10, 1.20 or 1.30 is actuated for a first time period. On the other hand when the actuating surface 1.11, 1.21 or 1.31 of the operating element 1.10, 1.20 or 1.30 is actuated for a second time period, which is shorter than the first time period, a second operating mode is activated. The second time period corresponds to a short tip with a finger 6 of an operator, i.e., it corresponds to a time period of for example 1 to 2 s, while the first time interval corresponds to a long tip of more than 2 s, for example 5 s.

In the following, these two operating modes are explained with reference to FIGS. 1 and 2 together with the functional block diagram of FIG. 3 based on air vent 1.1 as example.

Figure 3:
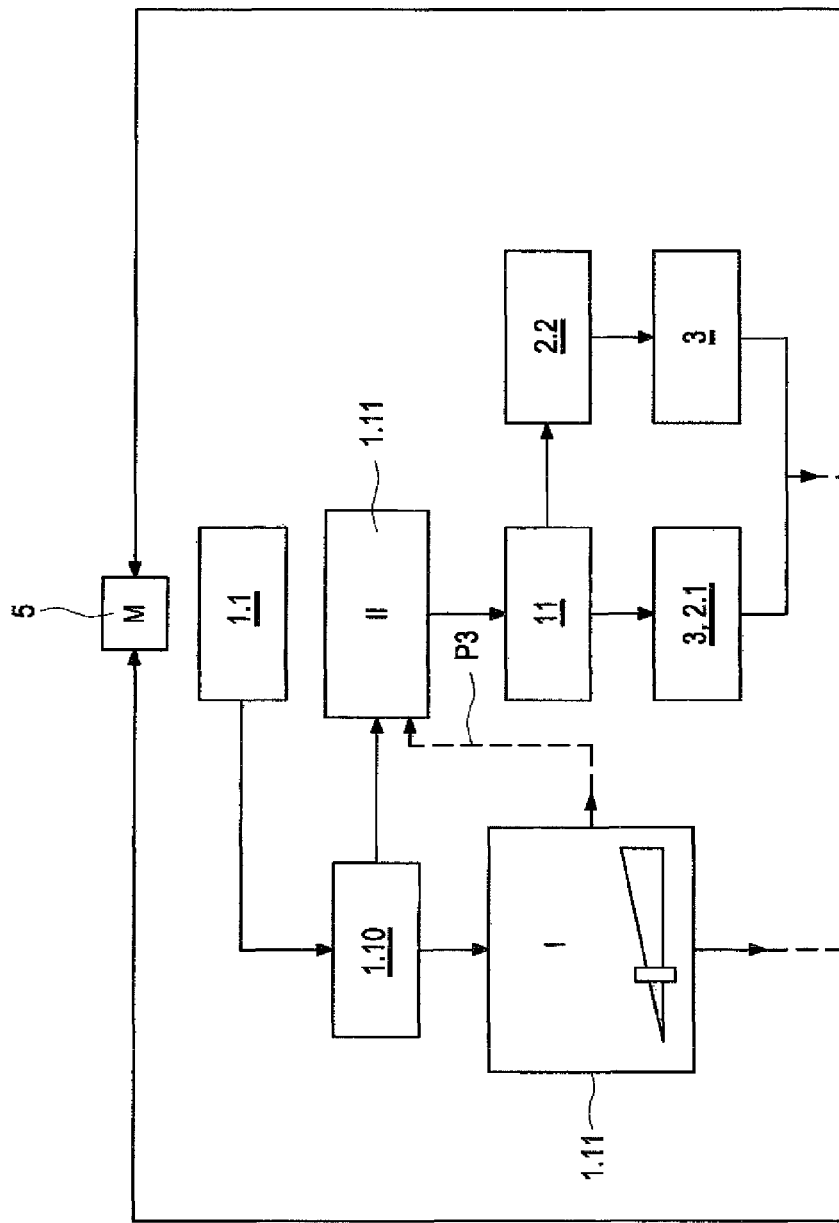
FIG. 3 is a functional block diagram for explaining the method according to the invention.

FIG. 3 shows the components of an operating device for realizing the two operating modes and includes a control device 11 of the vehicle 10, which is connected with the actuating surface 1.11 of the operating element 1.10 of the air vent 1.1, wherein a sensor system detects and analyzes a touching of this actuating surface 1.1 by the finger of an operator, in particular the duration of this touching. The control device 11 is also connected with a rotary switch 2.2 and with the onboard monitor 3. The adjustment at the air vent by an operator in the first operating mode I or in the second operating mode II is executed by the control device 11 by means of a drive 5, for example an electric motor, which controls the airflow corresponding to the setting in the operating mode I and II by opening or closing the air vent 1.1.

The actuating surface 1.11 according to FIG. 1 has a vertically extending virtual control slider with a handle (corresponding to a slide bar of a mechanical control slider), which is vertically slidable between two end points by touching the actuating surface 1.11 by means of a finger 6 of an operator. The actuation of this control slider requires an actuation duration which corresponds at least to the first time interval and thus activates the first operating mode I.

This enables setting in this operating mode I the outflow volume at the air vent 1.1 between a value zero, at which the handle is located at the lower end of the control slider, and a maximal value at which the handle is located at the upper end of the control slider. Such a virtual control slider is usually suited for intuitively adjusting the value of the outflow volume at the air vent 1.1, and thus represents a coarse adjustment of the desired value. The operator can recognize the adjusted value non-numerically only inaccurately by means of the position of the handle between the two end points. An accurate adjustment of the desired airflow at the air vent 1.1 is thus not possible. Even a scale arranged next to the control slider or a status indicator, illustrated in wedge shape in FIG. 3, cannot show the exact value.

When the activated operating mode I is activated and no further actuation occurs the drive 5 is actuated according to the position of the control slider according to the functional block diagram of FIG. 3.

When on the other hand the duration of actuation of the actuating surface 1.11 of the operating element 1.10 corresponds to a short tip by the finger 6 of an operator the second operating mode II is activated. As a result the control device 11 displays in a popup menu on the display of the onboard monitor, which serves for exactly adjusting the outflow volume at the air vent 1.1 by displaying the numerical value of the actual adjustment.

FIG. 2 exemplary shows such a popup menu 3.1. According to this in the upper region of the display 3 all four air vents installed in the instrument panel 12 are shown. Thus not only the air vents 1.1 and 1.2 installed between a combination instrument and provided for the driver are shown, but also air vents 1.3 and 1.4 for the copilot of the vehicle 10. When the air vent 1.1 was briefly tapped for activating the operating mode II this air vent 1.1 is graphically highlighted relative to the other air vent 1.2, 1.3 and 1.4. This air vent 1.1, which is selected for adjustment of the outflow volume, is displayed in the lower region of the display 3 with a numerical display 4, which shows the exact numerical value, i.e., 26% of the outflow volume at the air vent 1.1 and an upwards pointing Up-arrow P1 and a downward pointing Down-arrow P2. Via these two arrows P1 and P2 the value of the outflow volume can be exactly adjusted. For this purpose two possibilities are available.

When the display 3 is configured as touch-display, the region of this numerical display 4 displays a further operating element 2.1 with a touch sensitive actuating surface arranged in the region of the arrows P1 and P2. During touching of the Up-arrow P1 or the down-arrow the value of the outflow volume is increased or decreased.

The outflow value can also be adjusted at the air vent 1.1 by means of the display 4 by actuating the rotary switch 2.2 as further operating element. By means of the rotary switch 2.2 a graphical element is selected on the display 3 by optically highlighting, and by pressing this rotary switch 2.2 the respective function is activated. Thus either the Up-arrow P1 or the Down-arrow P2 can be selected by means of this rotary switch 2.2 and activated by pressing, and by subsequent turning the desired numerical value can then be adjusted as outflow volume of the air vent 1.1.

When according to FIG. 3 the adjustment was performed either by means of the touch-display as further operating element 2.1 or by means of the rotary switch as further operating element 2.2, the control device 11 controls the drive 5 corresponding to the adjusted value.

When the operator has first activated the operating mode I it is of course also possible that the operator subsequently activates the operating mode II according to the arrow P3 (see FIG. 3).

The popup menu 34.1 can also be realized in that not only the outflow volume of the air vent 1.1 which was selected by tapping the operating part 1.10 can be adjusted via this pop-up menu 3.1 but also the outflow volume of the further air vents 1.2, 1.3, 1.4 displayed in the upper region of the display 3. When the display 3 is configured as touch panel and thus serves as further operating element 2.1 the further air vents 1.2, 1.3 and 1.4 can be selected by respective tapping and the outflow volume be adjusted by tapping the arrows P1 and P2. In addition the outflow volume of one of the further air vents 1.2, 1.3 or 1.4 can also be adjusted with the rotary switch 2.2 as further operating element by first selecting an air vent in the upper region of the display 3 and then activating one of the arrows P1 and P2 for adjusting the numerical value of the outflow volume.

Finally an additional function can be provided in the popup menu 3.1 with which the outflow volume of all air vents 1.1, 1.2, 1.3 and 1.4 can be simultaneously adjusted to a value so that the same outflow volume of an airstream is present at all air vents. For such a function a graphical element is provided on the display 3, which either has an actuating surface as touchpad for activating the function or which can be selected and activated via the rotary switch 2.2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating an air conditioning system of a vehicle, comprising:
   actuating an operating element of an air vent of the air condition system for a defined first time period, said actuating for the first time period causing activation of a control slider function for adjusting the outflow volume;
   actuating the operating element for a defined second time period which is shorter than the first time period, said actuating for the second time period causing a popup menu which optically displays a numerical value of an actual outflow volume of the air vent being displayed on an onboard monitor of the vehicle; and
   adjusting the outflow volume with a further operating element in the popup menu and simultaneously optically displaying a numerical value of the adjusted outflow volume.

2. The method of claim 1, wherein the further operating element is configured as a touch-sensitive screen of the onboard monitor.

3. The method of claim 1, wherein the further operating element is configured as a rotary switch.

4. The method of claim 1, further comprising displaying with the popup menu further air vents of the air conditioning system on the onboard monitor, wherein an outflow volume of the further air vents is adjustable by means of the further operating element.

5. The method of claim 1, further comprising displaying with the popup menu further air vents of the air conditioning system on the onboard monitor, wherein the outflow volume is adjustable for the air vent and the further air vents simultaneously with the further operating element.

6. An operating device for operating an air conditioning system of a vehicle, said operating device comprising:
   an air vent comprising at least one operating element, said operating element having a touch-sensitive actuating surface adapted to adjust an outflow volume of the air vent;
   a control device connected with the operating element, said control device being configured to cause a control slider function for adjusting the outflow volume to be displayed on the touch-sensitive actuating surface in response to actuation of the operating element for a defined first time period, and in response to actuation of the operating element for a defined second time period, which is shorter than the first time period, to cause a popup menu with an optical display of a numerical value of an actual outflow volume of the air vent to be displayed on an onboard monitor of the vehicle for adjustment of the outflow volume; and
   a further operating element for adjusting the outflow volume displayed in the popup menu.

7. The operating device of claim 6, wherein the further operating element is a touch-sensitive surface of the onboard monitor.

8. The operating device of claim 6, wherein the further operating element is configured as a rotary switch.

* * * * *